(12) United States Patent
Burton

(10) Patent No.: US 7,886,167 B2
(45) Date of Patent: Feb. 8, 2011

(54) LOAD CIRCUIT SUPPLY VOLTAGE CONTROL

(75) Inventor: Edward Burton, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 566 days.

(21) Appl. No.: 11/432,815

(22) Filed: May 11, 2006

(65) Prior Publication Data
US 2007/0262754 A1 Nov. 15, 2007

(51) Int. Cl.
*G06F 1/26* (2006.01)
*G11C 5/14* (2006.01)

(52) U.S. Cl. .................. 713/320; 713/300; 365/222; 365/226

(58) Field of Classification Search .................. 713/300, 713/320; 365/222, 226
See application file for complete search history.

(56) References Cited

U.S. PATENT DOCUMENTS

| | | | |
|---|---|---|---|
| 5,563,502 A | 10/1996 | Akioka et al. | |
| 5,784,328 A * | 7/1998 | Irrinki et al. | 365/222 |
| 5,812,860 A * | 9/1998 | Horden et al. | 713/322 |
| 5,838,578 A | 11/1998 | Pippin | |
| 6,119,241 A | 9/2000 | Michail et al. | |
| 6,393,374 B1 | 5/2002 | Rankin et al. | |
| 6,789,037 B2 | 9/2004 | Gunther et al. | |
| 6,809,606 B2 | 10/2004 | Wong et al. | |
| 6,885,233 B2 | 4/2005 | Huard et al. | |
| 6,889,332 B2 | 5/2005 | Helms et al. | |
| 6,924,710 B2 | 8/2005 | Wong et al. | |
| 6,928,559 B1 | 8/2005 | Beard | |
| 6,980,918 B2 | 12/2005 | Gunther et al. | |
| 7,098,635 B2 | 8/2006 | Burton | |
| 7,158,911 B2 | 1/2007 | Gunther et al. | |
| 7,282,975 B2 | 10/2007 | Burton et al. | |
| 7,482,792 B2 | 1/2009 | Burton et al. | |
| 7,642,764 B2 | 1/2010 | Burton et al. | |
| 2001/0003206 A1 * | 6/2001 | Pole et al. | 713/320 |
| 2001/0047494 A1 * | 11/2001 | Thomas et al. | 713/503 |
| 2003/0156483 A1 * | 8/2003 | Feurle et al. | 365/222 |

(Continued)

FOREIGN PATENT DOCUMENTS

KR 10-2004-0045914 A 6/2004

(Continued)

OTHER PUBLICATIONS

International PCT Search Report and Written Opinion, PCT/US2007/068544, mailed Oct. 4, 2007, 10 pages.

(Continued)

*Primary Examiner*—Thomas Lee
*Assistant Examiner*—Vincent T Tran
(74) *Attorney, Agent, or Firm*—Matthew C. Fagan

(57) ABSTRACT

For one disclosed embodiment, an apparatus comprises a load circuit having one or more memory devices, one or more temperature sensors to sense one or more temperatures for the load circuit, and supply voltage control circuitry to control supply voltage to be applied to the load circuit. The supply voltage control circuitry may vary the supply voltage based at least in part on one or more sensed temperatures when the load circuit is in an inactive state and may help retain one or more signals by one or more memory devices of the load circuit as the supply voltage is varied. Other embodiments are also disclosed.

23 Claims, 7 Drawing Sheets

U.S. PATENT DOCUMENTS

| | | | |
|---|---|---|---|
| 2004/0025061 A1* | 2/2004 | Lawrence | 713/300 |
| 2005/0135175 A1* | 6/2005 | Houston et al. | 365/229 |
| 2005/0146315 A1 | 7/2005 | Burton | |
| 2005/0146361 A1 | 7/2005 | Burton et al. | |
| 2005/0268133 A1 | 12/2005 | Beard | |
| 2006/0095798 A1* | 5/2006 | Finkelstein et al. | 713/300 |
| 2006/0195708 A1* | 8/2006 | Kato et al. | 713/300 |
| 2007/0019488 A1* | 1/2007 | Heilmann et al. | 365/211 |
| 2007/0045825 A1* | 3/2007 | Chan et al. | 257/723 |
| 2007/0070769 A1* | 3/2007 | Braceras et al. | 365/226 |
| 2007/0223299 A1* | 9/2007 | Egerer et al. | 365/222 |
| 2009/0015232 A1* | 1/2009 | Rozen et al. | 323/318 |

FOREIGN PATENT DOCUMENTS

| | | | |
|---|---|---|---|
| WO | WO 03/036448 A2 | 5/2003 | |

OTHER PUBLICATIONS

Korean Intellectual Property Office Notice of Preliminary Rejection for corresponding Patent Application No.10-2008-7027249, mailed Mar. 15, 2010, 4 pages.

English Translation of Korean Intellectual Property Office Notice of Preliminary Rejection for corresponding Patent Application No. 10-2008-7027249, mailed Mar. 15, 2010, 3 pages.

Taiwan Intellectual Property Office Office Action and Search Report for corresponding Patent Application No. 96116681, mailed Jul. 7, 2010, 4 pages.

English Translation of Taiwan Intellectual Property Office Office Action and Search Report for corresponding Patent Application No. 96116681, mailed Jul. 7, 2010, 4 pages.

\* cited by examiner

LOAD CIRCUIT SUPPLY VOLTAGE CONTROL

FIELD

Embodiments described herein generally relate to supply voltage control for a circuit.

BRIEF DESCRIPTION OF THE DRAWINGS

Embodiments are illustrated by way of example and not limitation in the figures of the accompanying drawings, in which like references indicate similar elements and in which.

The figures of the drawings are not necessarily drawn to scale.

DETAILED DESCRIPTION

The following detailed description sets forth example embodiments of apparatuses, methods, mediums, and systems relating to load circuit supply voltage control. Features, such as structure(s), function(s), and/or characteristic(s) for example, are described with reference to one embodiment as a matter of convenience; various embodiments may be implemented with any suitable one or more described features.

Figure 1:
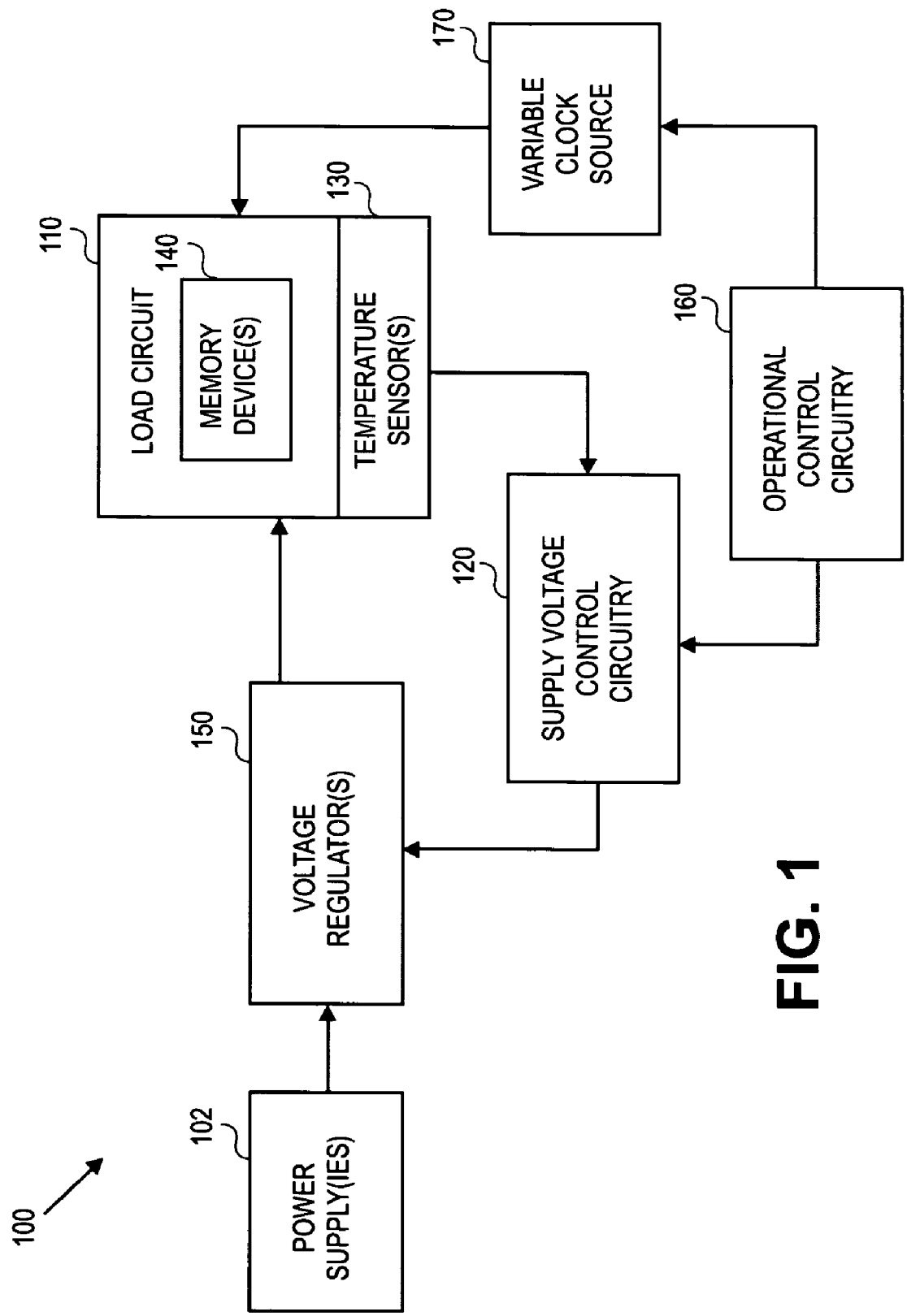
FIG. 1 illustrates, for one embodiment, a block diagram of a system having circuitry to control supply voltage for a load circuit.

FIG. 1 illustrates, for one embodiment, a system 100 comprising a load circuit 110 and supply voltage control circuitry 120 to control supply voltage to be applied to load circuit 110 based at least in part on one or more sensed temperatures for load circuit 110 when load circuit 110 is in an inactive state. Supply voltage control circuitry 120 for one embodiment may vary supply voltage for load circuit 110 based at least in part on one or more sensed temperatures when the load circuit is in an inactive state. Supply voltage control circuitry 120 for one embodiment may help retain one or more signals by one or more memory devices 140 of load circuit 110 as the supply voltage is varied.

System 100 for one embodiment may comprise one or more temperature sensors 130 to sense one or more temperatures for load circuit 110. Temperature sensor(s) 130 may be implemented in any suitable manner and positioned in any suitable location relative to load circuit 110 to sense one or more temperatures for load circuit 110. Temperature sensor(s) 130 for one embodiment may be positioned to sense one or more temperatures of load circuit 110. Supply voltage control circuitry 120 for one embodiment may be coupled to receive one or more signals from one or more temperature sensors 130 to help control supply voltage for load circuit 110.

Supply voltage control circuitry 120 for one embodiment may control supply voltage for load circuit 110 when in an inactive state to help reduce power consumption and/or heat dissipation while also helping to retain one or more signals in one or more memory devices 140 of load circuit 110. Because current leakage in load circuit 110 for one embodiment may generally increase at a greater rate as the temperature of load circuit 110 increases, supply voltage control circuitry 120 for one embodiment may help avoid such increased current leakage, and therefore help reduce power consumption and/or heat dissipation, by supplying a relatively lower supply voltage to load circuit 110 when at higher temperatures. Because one or more memory devices 140 for one embodiment are to have a higher supply voltage to help retain one or more signals as the temperature of load circuit 110 decreases, supply voltage control circuitry 120 for one embodiment may supply a relatively higher supply voltage to load circuit 110 when at lower temperatures.

Supply voltage control circuitry 120 for one embodiment may control supply voltage for load circuit 110 and may control supply voltage for an integrated circuit having load circuit 110 based at least in part on the supply voltage for load circuit 110. Such an integrated circuit for one embodiment may include at least load circuit 110, temperature sensor(s) 130, and supply voltage control circuitry 120.

Supply voltage control circuitry 120 for one embodiment may identify a target retention supply voltage for load circuit 110 based at least in part on one or more sensed temperatures and may control supply voltage applied to load circuit 110 based at least in part on the identified target retention supply voltage. Supply voltage control circuitry 120 for one embodiment may control a target supply voltage for load circuit 110. Supply voltage control circuitry 120 for one embodiment may control a target supply voltage for an integrated circuit having load circuit 110.

System 100 for one embodiment may comprise one or more power supplies 102 and one or more voltage regulators 150 coupled to receive power from one or more power supplies 102 to apply supply voltage to load circuit 110. Power supply(ies) 102 for one embodiment may include a battery. Power supply(ies) 102 for one embodiment may include an alternating current to direct current (AC-DC) converter.

Supply voltage control circuitry 120 for one embodiment may be coupled to control one or more voltage regulators 150 in any suitable manner to control supply voltage for load circuit 110. Supply voltage control circuitry 120 for one embodiment may generate any suitable one or more control signals to help control one or more voltage regulators 150. Supply voltage control circuitry 120 for one embodiment may control a voltage regulator that is on an integrated circuit having load circuit 110 and that is to apply supply voltage to load circuit 110. Supply voltage control circuitry 120 for one embodiment may control a voltage regulator that is to apply supply voltage to an integrated circuit having load circuit 110.

Supply voltage control circuitry 120 for one embodiment may control supply voltage for load circuit 110 based at least in part on one or more sensed temperatures for load circuit 110 for any suitable one or more operational states for load circuit 110, including any suitable one or more inactive states and/or any suitable one or more active states. Supply voltage control circuitry 120 for one embodiment may control supply voltage for load circuit 110 based at least in part on one or more sensed temperatures for load circuit 110 regardless of the operational state for load circuit 110.

Supply voltage control circuitry 120 for one embodiment may control supply voltage for load circuit 110 based at least in part on an operational state for load circuit 110. System 100 for one embodiment may comprise operational control circuitry 160 to help set and/or monitor an operational state for load circuit 110. Operational control circuitry 160 for one embodiment may be coupled to output to supply voltage control circuitry 120 one or more signals to identify to supply voltage control circuitry 120 an operational state for load circuit 110. Operational control circuitry 160 for one embodiment may store one or more bits in one or more registers, for example, to identify an operational state for load circuit 110.

Supply voltage control circuitry 120 for one embodiment may control supply voltage applied to load circuit 110 based at least in part on a frequency of one or more clock signals for load circuit 110 when load circuit 110 is in an active state. Supply voltage control circuitry 120 for one embodiment may control supply voltage for load circuit 110 when in an active state to help reduce power consumption and/or heat dissipation while also helping to support operation of load circuit 110 at the frequency of one or more clock signals for load circuit 110. Supply voltage control circuitry 120 for one embodiment may identify a target active supply voltage for load circuit 110 and may control supply voltage applied to load circuit 110 based at least in part on the identified target active supply voltage.

System 100 for one embodiment may comprise operational control circuitry 160 to help set and/or monitor a frequency of one or more clock signals for load circuit 110. Operational control circuitry 160 for one embodiment may be coupled to output to supply voltage control circuitry 120 one or more signals to identify a frequency of one or more clock signals for load circuit 110. Operational control circuitry 160 for one embodiment may store one or more bits in one or more registers, for example, to identify a frequency of one or more clock signals for load circuit 110.

System 100 for one embodiment may comprise a variable clock source 170 coupled to apply one or more clock signals having a variable frequency to load circuit 110. Variable clock source 170 for one embodiment may be coupled to output one or more clock signals having a frequency based on an operational state for load circuit 110. Operational control circuitry 160 for one embodiment may be coupled to help control variable clock source 170 to vary the frequency of one or more clock signals to clock or activate load circuit 110. Operational control circuitry 160 for one embodiment may therefore help control power consumption and/or heat dissipation for load circuit 110. Operational control circuitry 160 for one embodiment may generate any suitable one or more control signals to help control variable clock source 170. Variable clock source 170 for one embodiment may be coupled to receive one or more clock signals having a predetermined frequency from an external clock source and may include any suitable circuitry to generate and/or output one or more clock signals of any suitable frequency in response to one or more control signals from operational control circuitry 160.

Figure 2:
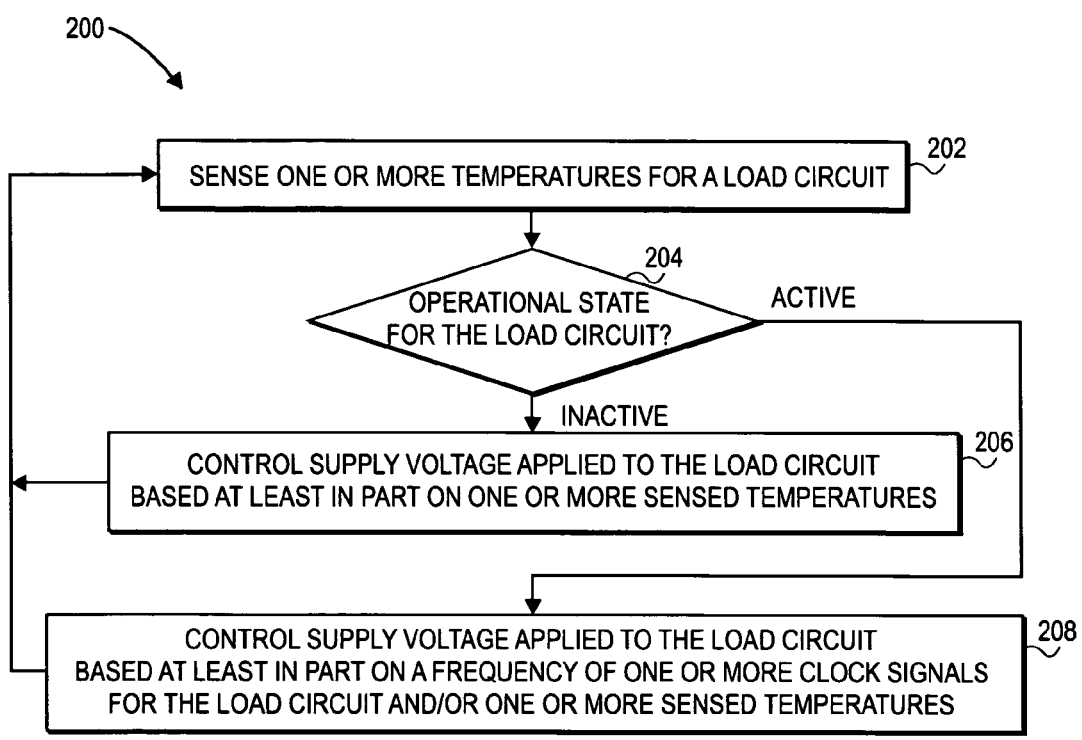
FIG. 2 illustrates, for one embodiment, a flow diagram to control supply voltage for a load circuit.

Supply voltage control circuitry 120 for one embodiment may control supply voltage for load circuit 110 in accordance with a flow diagram 200 of FIG. 2.

For block 202 of FIG. 2, supply voltage control circuitry 120 may use one or more temperature sensor(s) 130 to sense one or more temperatures for load circuit 110. When load circuit 110 is in an inactive state for block 204, supply voltage control circuitry 120 for block 206 may control supply voltage applied to load circuit 110 based at least in part on one or more sensed temperatures. When load circuit 110 is in an active state for block 204, supply voltage control circuitry 120 for block 208 may control supply voltage applied to load circuit 110 based at least in part on a frequency of one or more clock signals for load circuit 110 and/or one or more sensed temperatures.

Supply voltage control circuitry 120 for one embodiment may repeat operations for block 202 to continue to monitor one or more temperatures for load circuit 110 and for blocks 204-208 to continue to control supply voltage for load circuit 110.

Supply voltage control circuitry 120 may perform operations for blocks 202-208 in any suitable order and may or may not overlap in time the performance of any suitable operation with any other suitable operation. As one example, supply voltage control circuitry 120 may perform one or more operations to sense one or more temperatures for block 202 as supply voltage control circuitry 120 performs one or more operations to control supply voltage for block 206 or 208.

Supply voltage control circuitry 120 for one embodiment for block 204 may identify from operational control circuitry 160 an operational state for load circuit 110.

Supply voltage control circuitry 120 for one embodiment may not actively identify an operational state for load circuit 110 for block 204 and may inherently account for different operational states in controlling supply voltage for load circuit 110. As one example, supply voltage control circuitry 120 for one embodiment may control supply voltage applied to load circuit 110 based at least in part on a frequency of one or more clock signals for load circuit 110 and/or one or more sensed temperatures and identify a negligible frequency for load circuit 110 when in an inactive state.

Supply voltage control circuitry 120 may include any suitable circuitry to control supply voltage applied to load circuit 110 in any suitable manner.

Figure 3:
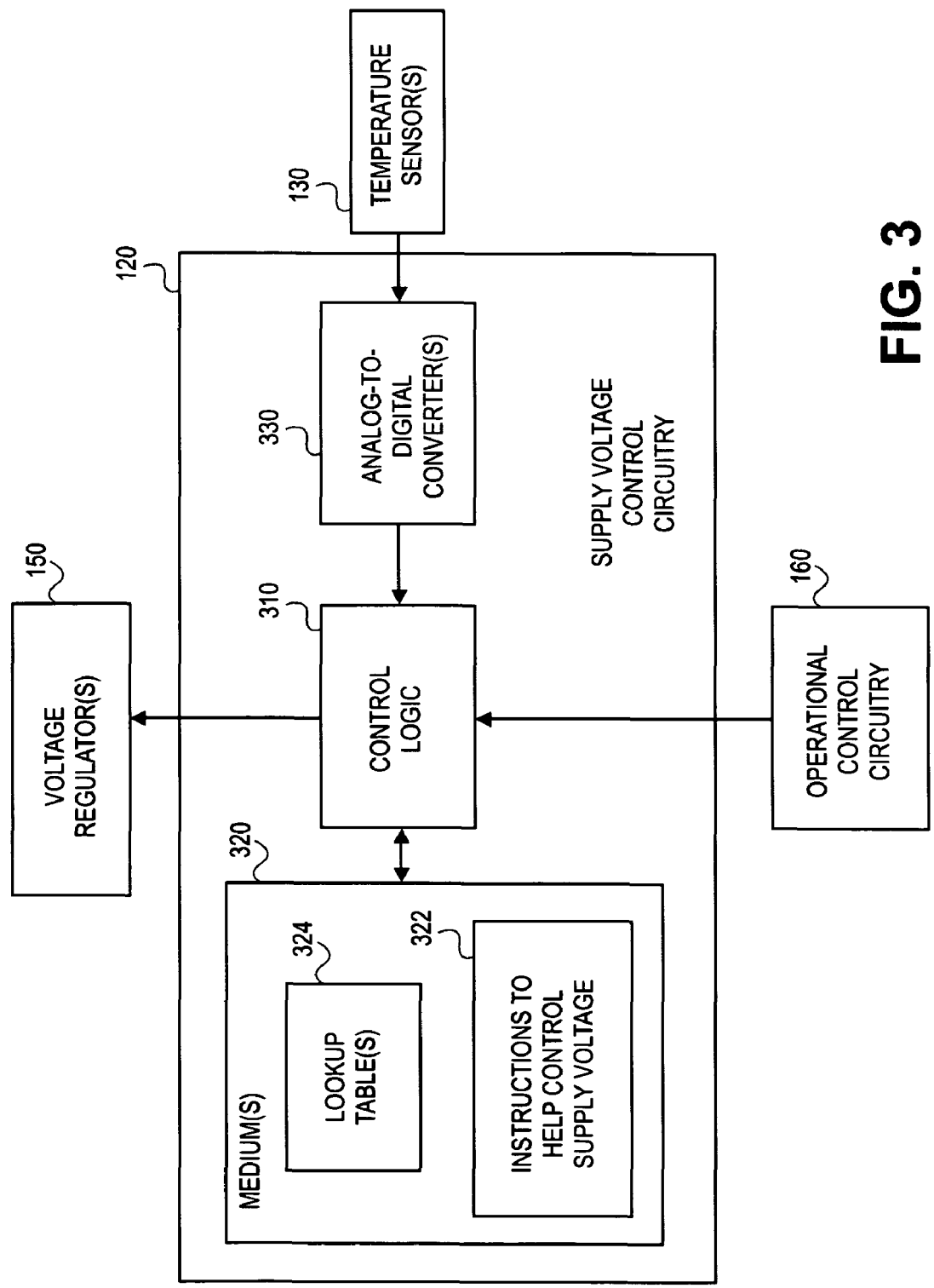
FIG. 3 illustrates, for one embodiment, example circuitry for supply voltage control circuitry of FIG. 1.

Supply voltage control circuitry 120 for one embodiment, as illustrated in FIG. 3, may include control logic 310 to perform instructions 322 to help control supply voltage for load circuit 110. Supply voltage control circuitry 120 may include any suitable control logic, such as a microcontroller for example, to perform any suitable instructions to help control supply voltage for load circuit 110. Supply voltage control circuitry 120 for one embodiment may use one or more lookup tables (LUTs) 324 to identify one or more values to help control supply voltage for load circuit 110. Supply voltage control circuitry 120 for one embodiment may calculate one or more values to help control supply voltage for load circuit 110.

Supply voltage control circuitry 120 for one embodiment, as illustrated in FIG. 3, may include one or more mediums 320 to store or embed instructions 322 and/or lookup table(s) (LUT(s)) 324. Medium(s) 320 may be implemented using any suitable technology including any suitable volatile memory circuitry, such as any suitable static random access memory (SRAM) for example, and/or any suitable non-volatile memory circuitry, such as any suitable programmable fuse or flash memory technology for example. Such volatile memory circuitry may be loaded with instructions 322 and/or LUT(s) 324 in any suitable manner, for example, upon reset of an integrated circuit having supply voltage control circuitry 120. Such non-volatile memory circuitry may be programmed or loaded with instructions 322 and/or LUTs 324 in any suitable manner, for example, prior to use of an integrated circuit having supply voltage control circuitry 120. Rewriteable non-volatile memory circuitry for one embodiment may be programmed or loaded with instructions 322 and/or LUTs 324 in any suitable manner, for example, upon reset of the integrated circuit. Supply voltage control circuitry 120 for one embodiment may be coupled to receive instructions and/or values from a medium, in lieu of and/or in addition to one or more of medium(s) 320, on an integrated circuit having supply voltage control circuitry 120 and/or a medium external to the integrated circuit.

Control logic 310 for one embodiment may be coupled to sense temperature(s) using temperature sensor(s) 130 in any suitable manner. Control logic 310 for one embodiment may be coupled to receive signal(s) from temperature sensor(s) 130 in any suitable manner. Supply voltage control circuitry 120 for one embodiment may include one or more analog-to-digital converters (ADCs) 330 coupled to receive and convert into digital form one or more analog signals from temperature sensor(s) 130. ADC(s) 330 may alternatively be considered a part of temperature sensor(s) 130. Control logic 310 for one embodiment may be coupled to receive signal(s) from operational control circuitry 160 in any suitable manner. Control logic 310 may be coupled to output signal(s) to help control one or more voltage regulators 150 in any suitable manner.

Use of Target Retention and Active Supply Voltages

Figure 4:
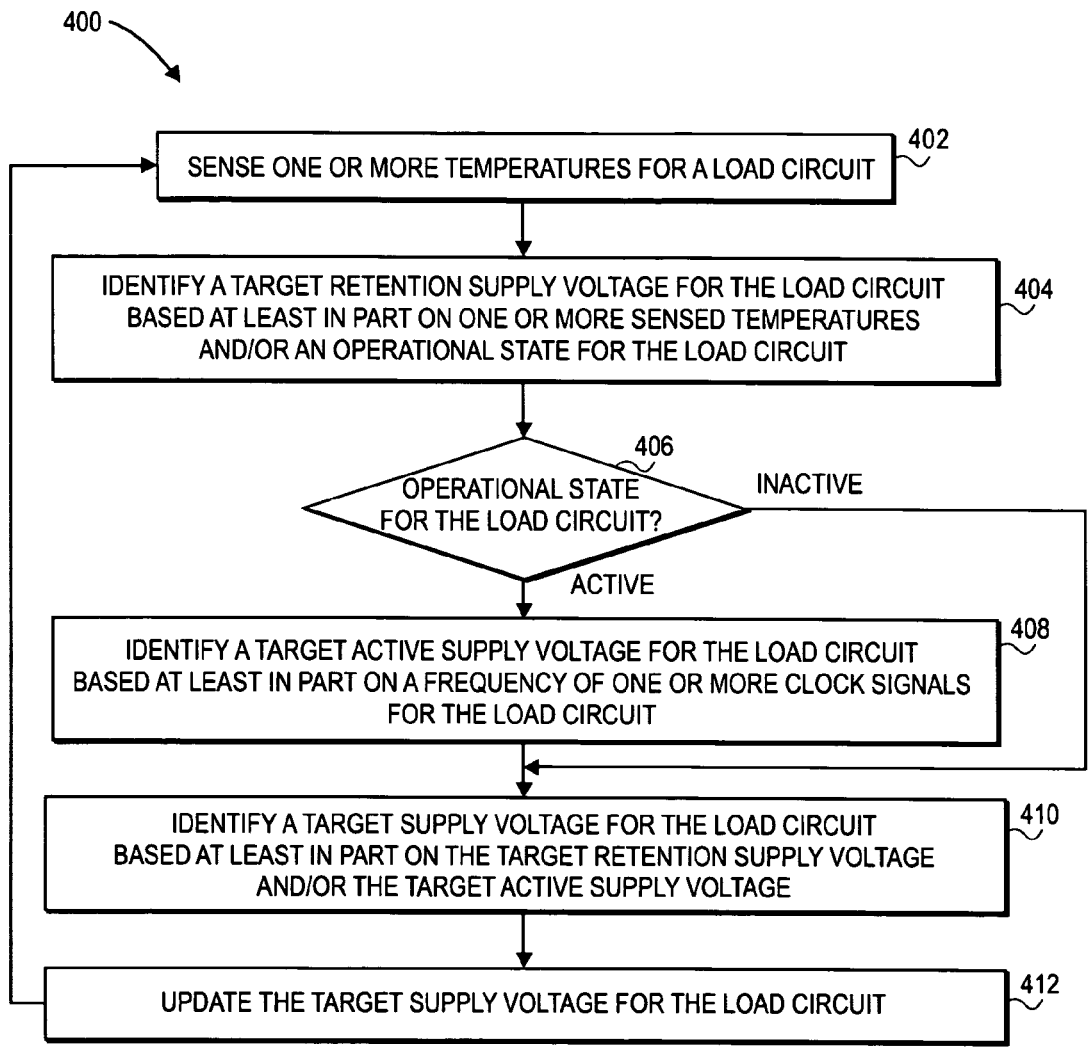
FIG. 4 illustrates, for one embodiment, a flow diagram to control supply voltage for a load circuit.

Supply voltage control circuitry 120 for one embodiment may control supply voltage for load circuit 110 in accordance with a flow diagram 400 of FIG. 4. Supply voltage control circuitry 120 for one embodiment may be implemented as described in connection with FIG. 3 to control supply voltage for load circuit 110 in accordance with flow diagram 400.

For block 402 of FIG. 4, supply voltage control circuitry 120 may use one or more temperature sensor(s) 130 to sense one or more temperatures for load circuit 110. Supply voltage control circuitry 120 for block 404 may identify a target retention supply voltage for load circuit 110 based at least in part on one or more sensed temperatures and/or an operational state for load circuit 110. Supply voltage control circuitry 120 for one embodiment may identify a target retention supply voltage to be applied to load circuit 110 to help retain one or more signals in one or more memory devices 140 of load circuit 110 while also helping to reduce power consumption and/or heat dissipation. Supply voltage control circuitry 120 for one embodiment for block 404 may use one or more lookup tables 324 based at least in part on one or more sensed temperatures and/or an operational state for load circuit 110 to identify one or more values to identify a target retention supply voltage for load circuit 110. Supply voltage control circuitry 120 for one embodiment for block 404 may use a temperature value as an index to read a corresponding target retention supply voltage value from a lookup table.

When load circuit 110 is in an inactive state for block 406, supply voltage control circuitry 120 for block 410 may identify a target supply voltage for load circuit 110 based at least in part on the target retention supply voltage identified for block 404. Supply voltage control circuitry 120 for one embodiment for block 410 may identify a target supply voltage for load circuit 110 as the target retention supply voltage identified for block 404. Supply voltage control circuitry 120 for block 412 may then update the target supply voltage for load circuit 110. Supply voltage control circuitry 120 for one embodiment for block 412 may control a voltage regulator that is on an integrated circuit having load circuit 110 and that is to apply supply voltage to load circuit 110 to update the target supply voltage for load circuit 110.

When load circuit 110 is in an active state for block 406, supply voltage control circuitry 120 for block 408 may identify a target active supply voltage for load circuit 110 based at least in part on a frequency of one or more clock signals for load circuit 110. Supply voltage control circuitry 120 for one embodiment may identify a target active supply voltage to be applied to load circuit 110 to help support operation of load circuit 110 at the frequency of one or more clock signals for load circuit 110 while also helping to reduce power consumption and/or heat dissipation. Supply voltage control circuitry 120 for one embodiment for block 408 may use one or more lookup tables 324 based at least in part on the frequency of one or more clock signals for load circuit 110 to identify one or more values to identify a target active supply voltage for load circuit 110. Supply voltage control circuitry 120 for one embodiment for block 408 may use a frequency value as an index to read a corresponding target active supply voltage value from a lookup table.

Supply voltage control circuitry 120 for block 410 may identify a target supply voltage for load circuit 110 based at least in part on the target active supply voltage identified for block 408 and/or the target retention supply voltage identified for block 404. Supply voltage control circuitry 120 for one embodiment for block 410 may identify a target supply voltage for load circuit 110 as the target active supply voltage identified for block 408. Supply voltage control circuitry 120 for one embodiment for block 410 may identify a target supply voltage for load circuit 110 as the greater of the target active supply voltage identified for block 408 and the target retention supply voltage identified for block 404. Supply voltage control circuitry 120 for block 412 may update the target supply voltage for load circuit 110. Supply voltage control circuitry 120 for one embodiment for block 412 may control a voltage regulator that is on an integrated circuit having load circuit 110 and that is to apply supply voltage to load circuit 110 to update the target supply voltage for load circuit 110.

Supply voltage control circuitry 120 for one embodiment may repeat operations for block 402 to continue to monitor one or more temperatures for load circuit 110 and for blocks 404-412 to continue to identify and update a target supply voltage for load circuit 110.

Supply voltage control circuitry 120 may perform operations for blocks 402-412 in any suitable order and may or may not overlap in time the performance of any suitable operation with any other suitable operation. As one example, supply voltage control circuitry 120 may perform one or more operations to sense one or more temperatures for block 402 as supply voltage control circuitry 120 performs one or more operations to update a target supply voltage for block 412.

Supply voltage control circuitry 120 for one embodiment for block 406 may identify from operational control circuitry 160 an operational state for load circuit 110.

Supply voltage control circuitry 120 for one embodiment may not actively identify an operational state for load circuit 110 for block 406 and may inherently account for different operational states in identifying a target supply voltage for load circuit 110. As one example, supply voltage control circuitry 120 for one embodiment may identify both a target retention supply voltage and a target active supply voltage for load circuit 110, identifying a low or negligible target active supply voltage for load circuit 110 when in an inactive state, and identify a target supply voltage for load circuit 110 as the greater of the target retention supply voltage and the target active supply voltage. Supply voltage control circuitry 120 for one embodiment may possibly identify the target retention supply voltage as being greater when load circuit 110 is in an active state for relatively low clock frequencies.

Supply voltage control circuitry 120 for another embodiment may identify an operational state for load circuit 110. When load circuit 110 is in an inactive state, supply voltage control circuitry 120 may then identify a target retention supply voltage for load circuit 110 and then identify a target supply voltage for load circuit 110 based at least in part on the target retention supply voltage. When load circuit 110 is in an active state, supply voltage control circuitry 120 may then identify a target active supply voltage for load circuit 110 and then identify a target supply voltage for load circuit 110 based at least in part on the target active supply voltage.

Supply Voltage Control for Multiple Load Circuits

Figure 5:
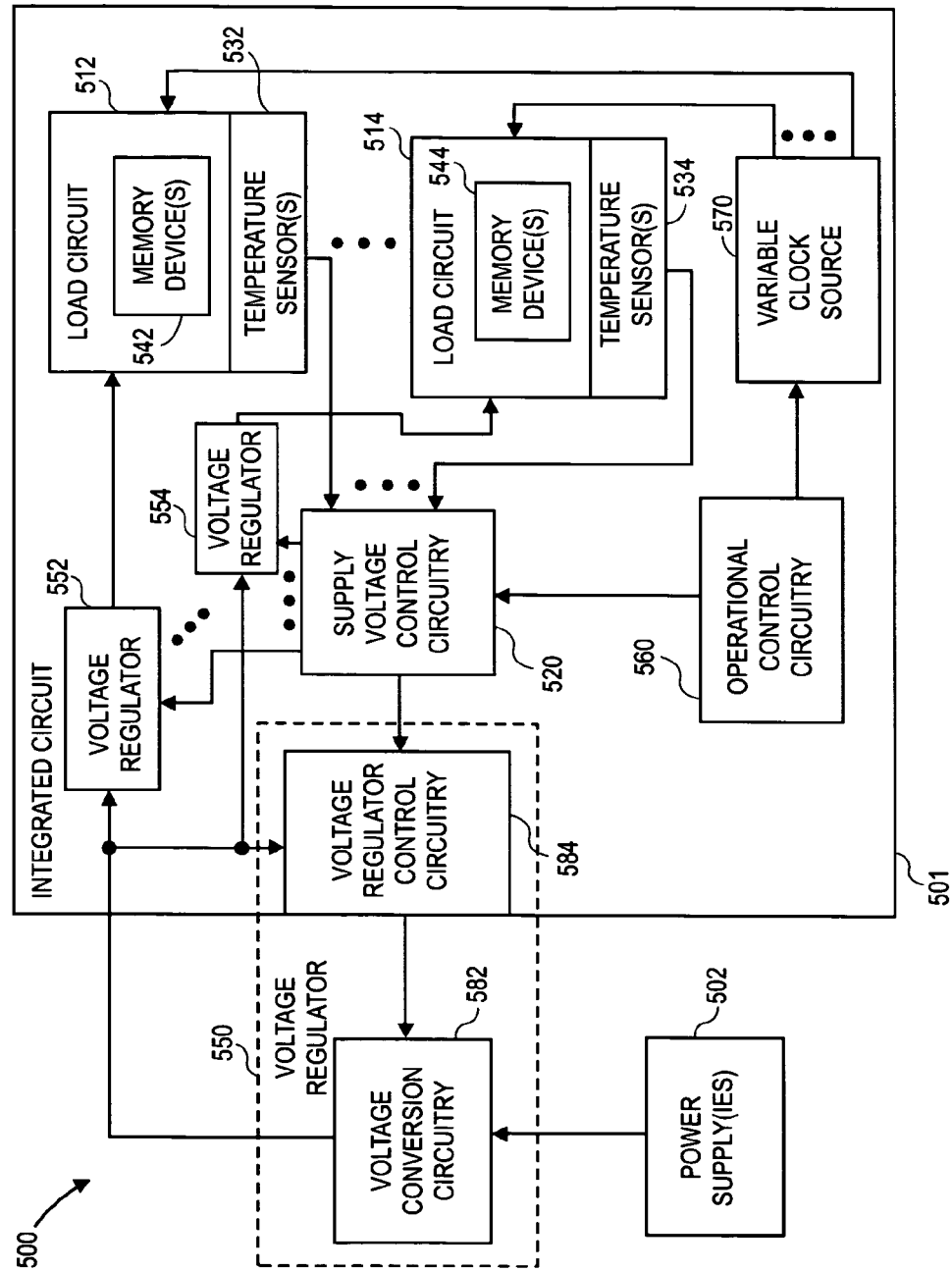
FIG. 5 illustrates, for one embodiment, a block diagram of a system having circuitry to control supply voltage for one or more of multiple load circuits.

FIG. 5 illustrates, for one embodiment, a system 500 comprising multiple load circuits, such as load circuits 512 and 514 for example, and supply voltage control circuitry 520 to control supply voltage to be applied to one or more of the multiple load circuits based at least in part on one or more sensed temperatures for one or more of the multiple load circuits when in an inactive state. Supply voltage control circuitry 520 for one embodiment may vary supply voltage for one or more load circuits based at least in part on one or more sensed temperatures for one or more load circuits when in an inactive state. Supply voltage control circuitry 520 for one embodiment may help retain one or more signals by one or more memory devices, such as memory device(s) 542 and/or memory device(s) 544 for example, of one or more load circuits as supply voltage is varied.

System 500 for one embodiment may comprise one or more temperature sensors, such as one or more temperature sensors 532 and one or more temperature sensors 534 for example, for one or more of the multiple load circuits to sense one or more temperatures for a corresponding load circuit. Such temperature sensor(s) may be implemented in any suitable manner and positioned in any suitable location relative to a corresponding load circuit to sense one or more temperatures for that load circuit. Such temperature sensor(s) for one embodiment may be positioned to sense one or more temperatures of a corresponding load circuit. Supply voltage control circuitry 520 for one embodiment may be coupled to receive one or more signals from one or more temperature sensors to help control supply voltage for one or more load circuits.

Supply voltage control circuitry 520 for one embodiment may control supply voltage for one or more of multiple load circuits and may control supply voltage for integrated circuit 501 based at least in part on the supply voltage for such load circuit(s). Integrated circuit 501 for one embodiment, as illustrated in FIG. 5, may include at least multiple load circuits, temperature sensor(s) for one or more load circuits, and supply voltage control circuitry 520.

Supply voltage control circuitry 520 for one embodiment may control a target supply voltage for one or more load circuits. Supply voltage control circuitry 520 for one embodiment may control a target supply voltage for integrated circuit 501 having multiple load circuits.

System 500 for one embodiment may comprise one or more power supplies 502 and a voltage regulator 550 coupled to receive power from one or more power supplies 502 to apply supply voltage to integrated circuit 501. Power supply(ies) 502 for one embodiment may include a battery. Power supply(ies) 502 for one embodiment may include an alternating current to direct current (AC-DC) converter.

Voltage regulator 550 for one embodiment, as illustrated in FIG. 5, may comprise voltage conversion circuitry 582 coupled to apply supply voltage to integrated circuit 501. Voltage conversion circuitry 582 may comprise any suitable circuitry to receive power from one or more power supplies 502 and apply supply voltage to integrated circuit 501 in any suitable manner. Voltage conversion circuitry 582 for one embodiment may comprise any suitable circuitry to form a switched power delivery portion for voltage regulator 550. Suitable circuitry for voltage conversion circuitry 582 may include, for example, suitable power transistor(s) and/or passive components, such as inductor(s) and/or capacitor(s) for example. Voltage conversion circuitry 582 for one embodiment, as illustrated in FIG. 5, may be external to integrated circuit 501.

Voltage regulator 550 for one embodiment, as illustrated in FIG. 5, may comprise voltage regulator control circuitry 584 coupled to control voltage conversion circuitry 582. Voltage regulator control circuitry 584 may comprise any suitable circuitry to control voltage conversion circuitry 582 to apply supply voltage to integrated circuit 501 in any suitable manner. Voltage regulator control circuitry 584 for one embodiment may be coupled to monitor supply voltage applied to integrated circuit 501 and control voltage conversion circuitry 582 to apply supply voltage to integrated circuit 501 based at least in part on the monitored supply voltage. Voltage regulator control circuitry 584 for one embodiment may control voltage conversion circuitry 582 to help apply and maintain supply voltage at or near a target supply voltage for integrated circuit 501. Voltage regulator control circuitry 584 for one embodiment may generate any suitable one or more control signals to help control voltage conversion circuitry 582. For one embodiment where voltage conversion circuitry 582 includes circuitry for a switched power delivery portion, voltage regulator control circuitry 584 for one embodiment may generate multiple phased, pulse width modulated control signals to control supply voltage applied to integrated circuit 501. Voltage regulator control circuitry 584 for one embodiment, as illustrated in FIG. 5, may be on integrated circuit 501. Voltage regulator control circuitry 584 for one embodiment may be external to integrated circuit 501.

Supply voltage control circuitry 520 for one embodiment may be coupled to control voltage regulator 550 in any suitable manner to control supply voltage for integrated circuit 501. Supply voltage control circuitry 520 may generate any suitable one or more control signals to help control voltage regulator 550. Supply voltage control circuitry 520 for one embodiment may be coupled to control a target supply voltage at or near which voltage regulator 550 is to apply and maintain supply voltage for integrated circuit 501. Supply voltage control circuitry 520 for one embodiment, as illustrated in FIG. 5, may be coupled to control voltage regulator control circuitry 584, and therefore control voltage conversion circuitry 582, to control supply voltage for integrated circuit 501.

System 500 for one embodiment may comprise one or more voltage regulators, such as voltage regulators 552 and 554 for example, on integrated circuit 501 and coupled to apply supply voltage to one or more load circuits. One or more voltage regulators on integrated circuit 501 may be coupled to receive supply voltage from voltage regulator 550 and apply supply voltage to a corresponding load circuit. Such voltage regulator(s) may include any suitable circuitry, such as that to implement a linear voltage regulator for example. Supply voltage control circuitry 520 for one embodiment may be coupled to control one or more of such voltage regulator(s) in any suitable manner to control supply voltage for one or more load circuits. Supply voltage control circuitry 520 for one embodiment may generate any suitable one or more control signals to help control one or more of such voltage regulator(s). Supply voltage control circuitry 520 for one embodiment may be coupled to control a target supply voltage at or near which such a voltage regulator is to apply and maintain supply voltage for a corresponding load circuit.

Supply voltage control circuitry 520 for one embodiment may control supply voltage for one or more load circuits similarly as described for supply voltage control circuitry 120 of FIG. 1. Supply voltage control circuitry 520 for one embodiment may control supply voltage for a load circuit based at least in part on one or more sensed temperatures for that load circuit for any suitable one or more operational states for that load circuit. Supply voltage control circuitry 520 for one embodiment may control supply voltage for a load circuit based at least in part on an operational state for that load circuit. Supply voltage control circuitry 520 for one embodiment may control supply voltage applied to a load circuit based at least in part on a frequency of one or more clock signals for that load circuit when that load circuit is in an active state.

System 500 for one embodiment may comprise operational control circuitry 560 to help set and/or monitor an operational state for one or more load circuits. System 500 for one embodiment may comprise a variable clock source 570 to apply one or more clock signals having a variable frequency to one or more load circuits. System 500 for one embodiment may comprise operational control circuitry 560 to help set and/or monitor a frequency of one or more clock signals for one or more load circuits. Operational control circuitry 560 may similarly function as described for operational control circuitry 160 of FIG. 1. Variable clock source 570 may similarly function as described for variable clock source 170 of FIG. 1.

Supply voltage control circuitry 520 for one embodiment may separately control supply voltage for one or more of multiple load circuits on integrated circuit 501 and control supply voltage for integrated circuit 501 in any suitable manner based on the supply voltage of such load circuit(s).

Figure 6:
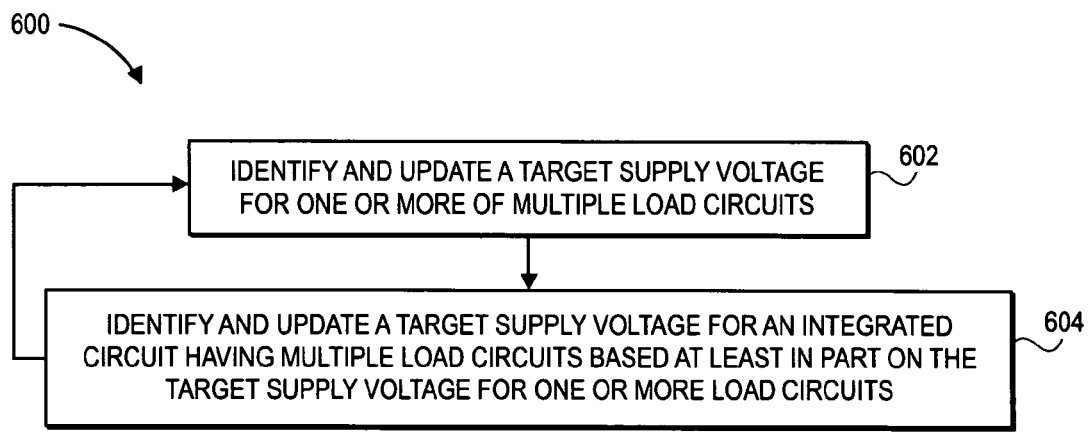
FIG. 6 illustrates, for one embodiment, a flow diagram to control supply voltage for one or more of multiple load circuits on an integrated circuit.

Supply voltage control circuitry 520 for one embodiment may control supply voltage for one or more of multiple load circuits on integrated circuit 501 in accordance with a flow diagram 600 of FIG. 6.

For block 602 of FIG. 6, supply voltage control circuitry 520 may identify and update a target supply voltage for one or more of load circuits. Supply voltage control circuitry 520 for one embodiment for block 602 may identify and update a target supply voltage for a load circuit similarly as described for supply voltage control circuitry 120 in connection with flow diagram 400 of FIG. 4.

For block 604, supply voltage control circuitry 520 may identify and update a target supply voltage for integrated circuit 501 based at least in part on the target supply voltage for one or more of multiple load circuits. Supply voltage control circuitry 520 for one embodiment for block 604 may identify a maximum target supply voltage for multiple load circuits and/or any other suitable circuits on integrated circuit 501 and identify and update a target supply voltage for integrated circuit 501 based at least in part on the identified maximum target supply voltage.

Supply voltage control circuitry 520 for one embodiment may repeat operations for blocks 602-604 to continue to identify and update a target supply voltage for one or more of load circuits and for integrated circuit 501.

Supply voltage control circuitry 520 may perform operations for blocks 602-604 in any suitable order and may or may not overlap in time the performance of any suitable operation with any other suitable operation. As one example, supply voltage control circuitry 120 may perform one or more operations to identify and/or update a target supply voltage for a load circuit for block 602 as supply voltage control circuitry 520 performs one or more operations to update a target supply voltage for integrated circuit 501 for block 604.

Supply voltage control circuitry 520 may include any suitable circuitry to control supply voltage applied to one or more load circuits in any suitable manner. Supply voltage control circuitry 520 for one embodiment may be similarly implemented as supply voltage control circuitry 120 as described in connection with FIG. 3. Supply voltage control circuitry 520 for one embodiment may include control logic to perform instructions to help control supply voltage for one or more load circuits and may use one or more lookup tables (LUTs) to identify one or more values to help control supply voltage for one or more load circuits. Such control logic for one embodiment may be coupled to sense temperature(s) using temperature sensor(s) for one or more load circuits in any suitable manner. Such control logic for one embodiment may be coupled to receive signal(s) from temperature sensor(s) for one or more load circuits in any suitable manner. Such control logic for one embodiment may be coupled to receive signal(s) from operational control circuitry 560 in any suitable manner. Such control logic for one embodiment may be coupled to output signal(s) to help control one or more voltage regulators in any suitable manner.

Example System

Supply voltage control circuitry 120 of FIG. 1 and supply voltage control circuitry 520 of FIG. 5 may be used to control supply voltage to be applied to any suitable one or more load circuits in any suitable environment.

Figure 7:
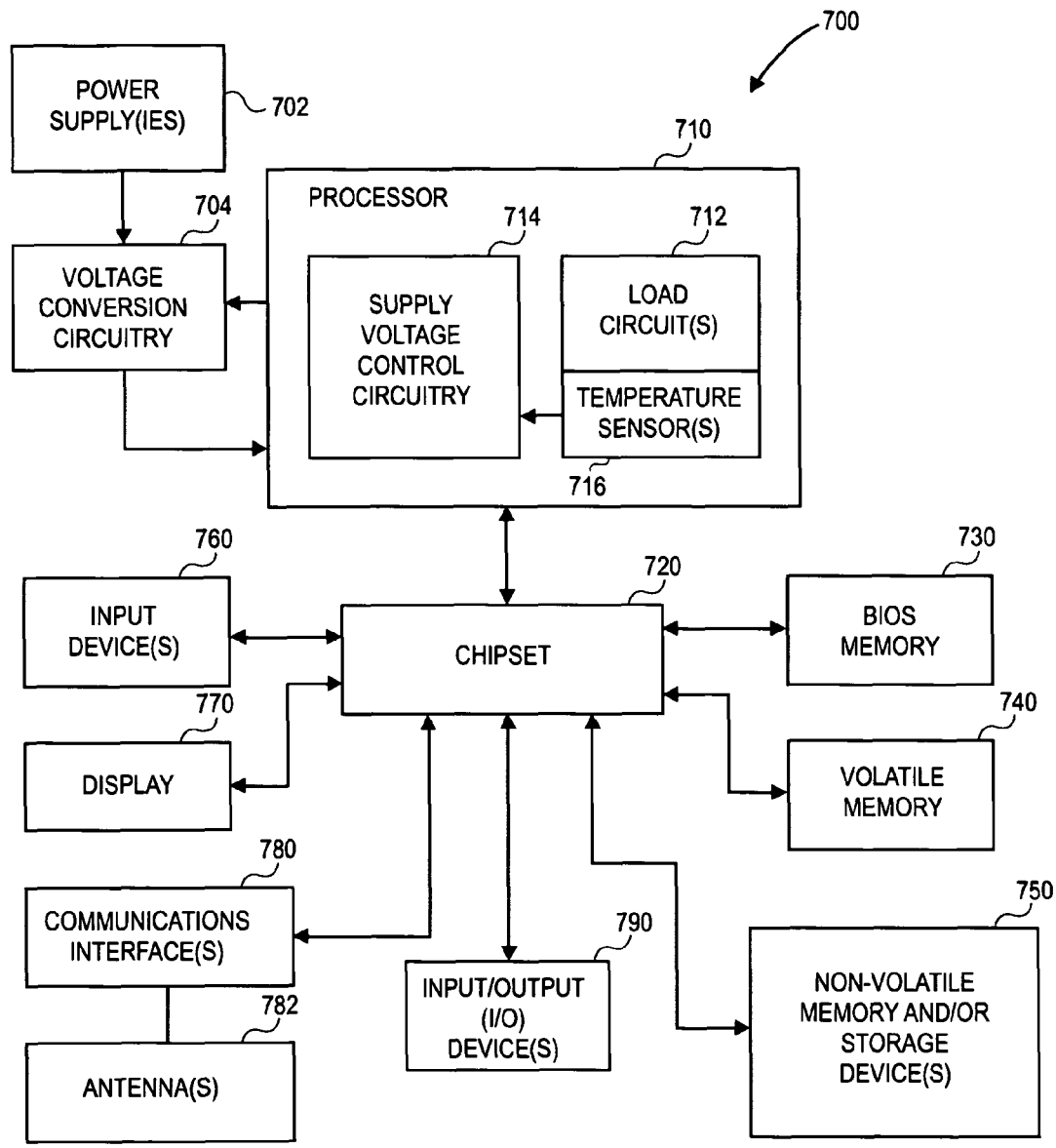
FIG. 7 illustrates, for one embodiment, a block diagram of an example system comprising a processor having circuitry to control supply voltage for one or more load circuits.

FIG. 7 illustrates an example system 700 comprising a processor 710 having one or more load circuits 712 and supply voltage control circuitry 714 to control supply voltage to be applied to one or more of load circuit(s) 712. One or more of load circuit(s) 712 may comprise any suitable one or more memory devices, such as at least a portion of cache memory and/or one or more registers for example. Load circuit(s) 712 for one embodiment may include one or more processor cores, one or more circuits for cache memory, one or more graphics processing circuits, and/or one or more vector math processing circuits. Supply voltage control circuitry 714 may similarly function as described for supply voltage control circuitry 120 of FIG. 1 and supply voltage control circuitry 520 of FIG. 5. Processor 710 for one embodiment may have one or more temperature sensors 716 for one or more of load circuit(s) 712 to sense one or more temperatures for a corresponding load circuit similarly as described, for example, for temperature sensor(s) 130 of FIG. 1. Load circuit(s) 712, supply voltage control circuitry 714, and temperature sensor(s) 716 for one embodiment may be on an integrated circuit for processor 710.

Processor 710 for one embodiment may be coupled to receive power from one or more power supplies 702. System 700 for one embodiment may comprise voltage conversion circuitry 704 coupled to receive power from one or more power supplies 702 and apply supply voltage to processor 710 in any suitable manner. Power supply(ies) 702 and voltage conversion circuitry 704 for one embodiment may similarly function as described for power supply(ies) 502 and voltage conversion circuitry 582 of FIG. 5.

System 700 for another embodiment may include multiple processors one or more of which may similarly have load circuit(s), supply voltage control circuitry, and temperature sensor(s).

System 700 for one embodiment may also include a chipset 720 coupled to processor 710, a basic input/output system (BIOS) memory 730 coupled to chipset 720, volatile memory 740 coupled to chipset 720, non-volatile memory and/or storage device(s) 750 coupled to chipset 720, one or more input devices 760 coupled to chipset 720, a display 770 coupled to chipset 720, one or more communications interfaces 780 coupled to chipset 720, and/or one or more other input/output (I/O) devices 790 coupled to chipset 720.

Chipset 720 for one embodiment may include any suitable interface controllers to provide for any suitable communications link to processor 710 and/or to any suitable device or component in communication with chipset 720.

Chipset 720 for one embodiment may include a firmware controller to provide an interface to BIOS memory 730. BIOS memory 730 may be used to store any suitable system and/or video BIOS software for system 700. BIOS memory 730 may include any suitable non-volatile memory, such as a suitable flash memory for example. BIOS memory 730 for one embodiment may alternatively be included in chipset 720.

Chipset 720 for one embodiment may include one or more memory controllers to provide an interface to volatile memory 740. Volatile memory 740 may be used to load and store data and/or instructions, for example, for system 700. Volatile memory 740 may include any suitable volatile memory, such as suitable dynamic random access memory (DRAM) for example.

Chipset 720 for one embodiment may include a graphics controller to provide an interface to display 770. Display 770 may include any suitable display, such as a cathode ray tube (CRT) or a liquid crystal display (LCD) for example. The graphics controller for one embodiment may alternatively be external to chipset 720.

Chipset 720 for one embodiment may include one or more input/output (I/O) controllers to provide an interface to non-volatile memory and/or storage device(s) 750, input device(s) 760, communications interface(s) 780, and/or I/O devices 790.

Non-volatile memory and/or storage device(s) 750 may be used to store data and/or instructions, for example. Non-volatile memory and/or storage device(s) 750 may include any suitable non-volatile memory, such as flash memory for example, and/or may include any suitable non-volatile storage device(s), such as one or more hard disk drives (HDDs), one or more compact disc (CD) drives, and/or one or more digital versatile disc (DVD) drives for example.

Input device(s) 760 may include any suitable input device(s), such as a keyboard, a mouse, and/or any other suitable cursor control device.

Communications interface(s) 780 may provide an interface for system 700 to communicate over one or more networks and/or with any other suitable device. Communications interface(s) 780 may include any suitable hardware and/or firmware. Communications interface(s) 780 for one embodiment may include, for example, a network adapter, a wireless network adapter, a telephone modem, and/or a wireless modem. For wireless communications, communications interface(s) 780 for one embodiment may use one or more antennas 782.

I/O device(s) 790 may include any suitable I/O device(s) such as, for example, an audio device to help convert sound into corresponding digital signals and/or to help convert digital signals into corresponding sound, a camera, a camcorder, a printer, and/or a scanner.

Although described as residing in chipset 720, one or more controllers of chipset 720 may be integrated with processor 710, allowing processor 710 to communicate with one or more devices or components directly. As one example, one or more memory controllers for one embodiment may be integrated with processor 710, allowing processor 710 to communicate with volatile memory 740 directly.

In the foregoing description, example embodiments have been described. Various modifications and changes may be made to such embodiments without departing from the scope of the appended claims. The description and drawings are, accordingly, to be regarded in an illustrative rather than a restrictive sense.

What is claimed is:

1. An apparatus comprising:
   a load circuit having one or more memory devices;
   one or more temperature sensors to sense one or more temperatures for the load circuit; and
   supply voltage control circuitry to control supply voltage to be applied to the load circuit, the supply voltage control circuitry to vary the supply voltage based at least in part on one or more sensed temperatures when the load circuit is in an inactive state and to help retain one or more signals by one or more memory devices of the load circuit as the supply voltage is varied,
   the supply voltage control circuitry to identify a target supply voltage for the load circuit based at least in part on one or more sensed temperatures and an operational state for the load circuit and to control supply voltage to be applied to the load circuit based at least in part on the identified target supply voltage.

2. The apparatus of claim 1, wherein the supply voltage control circuitry is to control supply voltage to be applied to the load circuit based at least in part on a frequency of one or more clock signals for the load circuit when the load circuit is in an active state.

3. The apparatus of claim 1, wherein the supply voltage control circuitry is to control supply voltage to be applied to the load circuit based at least in part on a first target supply voltage to help retain one or more signals by one or more memory devices of the load circuit and a second target supply voltage to help support operation of the load circuit at a frequency of one or more clock signals for the load circuit.

4. The apparatus of claim 1, wherein the supply voltage control circuitry is to control a target supply voltage for the load circuit.

5. The apparatus of claim 1, wherein the supply voltage control circuitry is to control a target supply voltage for an integrated circuit having the load circuit.

6. The apparatus of claim 1, wherein the supply voltage control circuitry is to identify from one or more lookup tables one or more values based on one or more sensed temperatures to help control supply voltage to be applied to the load circuit.

7. The apparatus of claim 1, wherein the supply voltage control circuitry is to perform instructions to control supply voltage to be applied to the load circuit.

8. The apparatus of claim 1, wherein the load circuit, temperature sensor, and supply voltage control circuitry are on an integrated circuit.

9. The apparatus of claim 1, comprising:
   one or more additional load circuits; and
   one or more additional temperature sensors to sense one or more temperatures for one or more additional load circuits,
   wherein the supply voltage control circuitry is to control supply voltage to be applied to one or more additional load circuits based at least in part on one or more sensed temperatures for one or more additional load circuits when in an inactive state.

10. The apparatus of claim 9, wherein the supply voltage control circuitry is to control a target supply voltage for one or more additional load circuits.

11. The apparatus of claim 9, wherein the supply voltage control circuitry is to control a target supply voltage for an integrated circuit having one or more additional load circuits.

12. An apparatus comprising:
a load circuit having one or more memory devices;
means for sensing one or more temperatures for the load circuit; and
means for controlling supply voltage to be applied to the load circuit, the controlling means for varying the supply voltage based at least in part on one or more sensed temperatures when the load circuit is in an inactive state and for helping to retain one or more signals by one or more memory devices of load circuit as the supply voltage is varied,
the controlling means for identifying a target supply voltage for the load circuit based at least in part on one or more sensed temperatures and an operational state for the load circuit and for controlling supply voltage to be applied to the load circuit based at least in part on the identified target supply voltage.

13. The apparatus of claim 12, comprising means for controlling supply voltage to be applied to the load circuit based at least in part on a frequency of one or more clock signals for the load circuit when the load circuit is in an active state.

14. The apparatus of claim 12, comprising:
one or more additional load circuits;
means for sensing one or more temperatures for one or more additional load circuits; and
means for controlling supply voltage to be applied to one or more additional load circuits based at least in part on one or more sensed temperatures for one or more additional load circuits when in an inactive state.

15. A machine readable medium having instructions that, when performed by control logic, cause the control logic to:
sense one or more temperatures for a load circuit having one or more memory devices; and
control supply voltage to be applied to the load circuit, the control including varying supply voltage to be applied to the load circuit based at least in part on one or more sensed temperatures when the load circuit is in an inactive state and helping to retain one or more signals by one or more memory devices of the load circuit as the supply voltage is varied,
the control including identifying a target supply voltage for the load circuit based at least in part on one or more sensed temperatures and an operational state for the load circuit and controlling supply voltage to be applied to the load circuit based at least in part on the identified target supply voltage.

16. The machine readable medium of claim 15, having instructions that, when performed by the control logic, cause the control logic to control supply voltage applied to the load circuit based at least in part on a frequency of one or more clock signals for the load circuit when the load circuit is in an active state.

17. The machine readable medium of claim 15, having instructions that, when performed by the control logic, cause the control logic to:
sense one or more temperatures for one or more additional load circuits; and
control supply voltage applied to one or more additional load circuits based at least in part on one or more sensed temperatures for one or more additional load circuits when in an inactive state.

18. A method comprising:
sensing one or more temperatures for a load circuit having one or more memory devices; and
controlling supply voltage applied to the load circuit, the controlling including varying the supply voltage based at least in part on one or more sensed temperatures when the load circuit is in an inactive state and helping to retain one or more signals by one or more memory devices of the load circuit as the supply voltage is varied,
the controlling including identifying a target supply voltage for the load circuit based at least in part on one or more sensed temperatures and an operational state for the load circuit and controlling supply voltage applied to the load circuit based at least in part on the identified target supply voltage.

19. The method of claim 18, comprising controlling supply voltage applied to the load circuit based at least in part on a frequency of one or more clock signals for the load circuit when the load circuit is in an active state.

20. The method of claim 18, comprising:
sensing one or more temperatures for one or more additional load circuits; and
controlling supply voltage applied to one or more additional load circuits based at least in part on one or more sensed temperatures for one or more additional load circuits when in an inactive state.

21. A system comprising:
a battery; and
a processor coupled to receive power from the battery, the processor having one or more, load circuits having one or more memory devices, one or more temperature sensors to sense one or more temperatures for one or more load circuits, and supply voltage control circuitry to control supply voltage to be applied to one or more load circuits, the supply voltage control circuitry to vary supply voltage based at least in part on one or more sensed temperatures for one or more load circuits when in an inactive state and to help retain one or more signals by one or more memory devices of one or more load circuits as supply voltage is varied,
the supply voltage control circuitry to identify a target supply voltage for one or more load circuits based at least in part on one or more sensed temperatures and an operational state for one or more load circuits and to control supply voltage to be applied to one or more load circuits based at least in part on the identified target supply voltage.

22. The system of claim 21, comprising voltage conversion circuitry external to the processor to apply supply voltage to the processor from the battery, the supply voltage control circuitry to control the voltage conversion circuitry.

23. The system of claim 21, wherein the supply voltage control circuitry is to control supply voltage to be applied to one or more load circuits when in an active state based at least in part on a frequency of one or more clock signals.

* * * * *